United States Patent [19]

Davis

[11] 4,087,384

[45] * May 2, 1978

[54] METHOD OF CATALYST PREPARATION FOR USE IN SUPPRESSING HYDROCARBON AND CARBON MONOXIDE EMISSION FROM INTERNAL COMBUSTION ENGINES

[76] Inventor: Robert E. Davis, 125 Hillcrest, Hinsdale, Ill.

[*] Notice: The portion of the term of this patent subsequent to Dec. 23, 1992, has been disclaimed.

[21] Appl. No.: 752,319

[22] Filed: Dec. 20, 1976

Related U.S. Application Data

[63] Continuation-in-part of Ser. No. 631,043, Nov. 12, 1975, abandoned, which is a continuation-in-part of Ser. No. 389,963, Aug. 20, 1973, Pat. No. 3,928,237, which is a continuation-in-part of Ser. No. 307,652, Nov. 17, 1972, abandoned.

[51] Int. Cl.$^2$ .................... B01J 23/42; B01J 23/44

[52] U.S. Cl. ..................... 252/472; 252/466 PT; 423/213.5

[58] Field of Search ............... 252/466 PT, 472; 423/213.5

[56] References Cited

U.S. PATENT DOCUMENTS

| 3,378,334 | 4/1968 | Bloch | 423/213.5 |
| 3,741,725 | 6/1973 | Graham | 423/213.5 |

*Primary Examiner*—W. J. Shine

[57] ABSTRACT

A method of lowering undesirable vehicle exhaust emissions includes preparing a catalyst for use in the exhaust stream of the vehicle. The method includes impregnating one group of alumina substrates with platinum, impregnating another group of alumina substrates with palladium, and the mixing the first and second groups of impregnated substrates.

4 Claims, No Drawings

METHOD OF CATALYST PREPARATION FOR USE IN SUPPRESSING HYDROCARBON AND CARBON MONOXIDE EMISSION FROM INTERNAL COMBUSTION ENGINES

RELATED APPLICATION

This is a continuation-in-part application of my co-pending application for "Method Of Catalyst Preparation For Use In Suppressing Hydrocarbon And Carbon Monoxide Emission From Internal Combustion Engines", Ser. No. 631,043, filed Nov. 12, 1975, now abandoned which was a continuation-in-part application of my application for "Method Of Catalyst Preparation For Use In Suppressing Hydrocarbon And Carbon Monoxide Emission From Internal Combustion Engines", Ser. No. 389,963, filed Aug. 20, 1973, now U.S. Pat. No. 3,928,237, which was a continuation-in-part application of my application for "Method Of Catalyst Preparation For Use In Suppressing Hydrocarbon And Carbon Monoxide Emission From Internal Combustion Engines", Ser. No. 307,652, filed Nov. 17, 1972, now abandoned.

BACKGROUND AND SUMMARY

This invention relates to suppressing hydrocarbon and carbon monoxide emissions from internal combustion engines, and, more particularly, to a catalyst and method of preparing the catalyst which oxidizes hydrocarbons (HC) and carbon monoxide (CO) to carbon dioxide and water.

In accordance with the invention platinum and palladium are deposited on different substrates. For example, the substrate may be alumina pellets in the form of spheres, cylinders, or other shapes, and platinum is deposited on one group of substrates and palladium is deposited on another group of substrates. The platinum-containing pellets and the palladium-containing pellets are then mixed, and the mixed pellets are placed in the path of an exhaust stream of an internal combustion engine. If desired, either or both of the platinum and palladium which is deposited on the substrate pellets can be complexed with ammonia.

Specific examples of the invention are set forth below as illustrative.

EXAMPLE I

Two grams of platinum metal were dissolved per liter of aqua regia, thereby forming platinum chloride which is soluble in water. Thereafter, ammonium hydroxide was added in sufficient amount to form a platinum-ammonia complex. The formation of a complex is noted as the color of the solution changes — in this case from an orange to a yellow. Thereafter, the solution was added to a quantity of the alumina pellets, as described above, and the mixture was agitated. Spherical-shaped alumina pellets (manufactured by Reynolds Metals Co.) were added to the solution, and the mixture was agitated. The amount of solution relative to the substrate pellets advantageously corresponds to the incipient wetness of the pellets, i.e., the amount of moisture that the pellets can absorb. This means that the solution will be absorbed by the pellets almost immediately after the pellets are placed in the solution, that the solution is absorbed uniformly by the pellets, and that the pellets are not immersed in the solution for any substantial time. The pellets are then dried by heating for about 10 minutes at a temperature of about 550° F. and thereafter heated for about 20–25 minutes at a temperature of the order of 750°–1000° F.

I have found the best catalyst is provided when the finished pellets contain 0.1% platinum by weight. I have found conversion activity does not increase significantly with more platinum.

253 milliliters of palladium chloride solution containing 1.2 gms of $PdCl_2$/liter was placed in a separate container. Ammonium hydroxide was added to this solution to form a palladium-ammonium complex, as indicated by the color change from orange to yellow. Alumina pellets were then added to the palladium-containing solution, and the container was agitated until the solution was absorbed by the pellets. The amount of palladium-containing solution corresponded to the incipient wetness of the pellets. The palladium-containing pellets were then heated in the manner previously described with respect to the platinum-containing pellets. After heat treatment, the platinum-containing pellets and the palladium-containing pellets may be mixed in any desired ratio. In this example, palladium comprised 0.045% of the palladium-coated pellets, by weight.

I have found that when platinum and palladium are used for an automotive catalyst, better results in the reduction of noxious emission are obtained when the platinum and the palladium are deposited on separate substrates. The phenomenon involved is not perfectly understood, and without intending to limit the invention, it is postulated that the ultimate results depend to some extent on the magnitude and polarity of the electropotential of the element as measured in my co-pending application for "Apparatus And Method For Measuring Conversion Efficiency Of Catalyst", Ser. No. 376,371, filed July 5, 1973, which is expressly incorporated herein by reference. For example, if these potentials are of an opposite polarity, it appears that the resultant catalytic effect is diminished when the metals are deposited on the same substrate and in any way chemically bound together or in physical contact with each other. In any case, in the case of platinum/palladium, the improved results noted above occur only when the platinum is deposited on one substrate and the palladium is deposited on a second substrate.

EXAMPLE II

In this example, the separate substrates of complexed platinum and complexed palladium are prepared as in Example I; however, a trace of chromium is added to the palladium solution and complexed. That is, less than about 0.1% by weight of chromium is added to the platinum solution. This appears to form smaller particles of the deposited metal and thereby increases the active surface and activity of the catalyst. This catalyst system reduced the amount of emission to about one-fifth that which had been present when platinum alone is used as a catalyst — that is, with equal amounts of platinum in each catalyst system for comparative purposes. Again, platinum comprised about 0.1% by weight of the final pellets.

EXAMPLE III

A complexed platinum solution was prepared by dissolving platinum in aqua regia and then complexing with concentrated $NH_4OH$.

A complexed palladium solution was prepared by dissolving palladium in aqua regia and then complexing with concentrated $NH_4OH$.

934.5gm of Reynolds No. 299 substrate was divided into a first portion of 562.5gm of substrate and a second portion of 1.372gm of substrate.

The first portion of 562.5gm of substrate was added to a portion of the complexed platinum solution having a volume just sufficient to be completely absorbed by the substrate and containing 1.125gm of platinum. The weight of the platinum on the first portion of substrate was 0.2% of the weight of the first portion substrate.

The second portion of 1372gm of substrate was added to a portion of the complexed palladium solution having a volume just sufficient to be completely absorbed by the substrate and containing 0.444gm of palladium. The weight of palladium on the second portion of substrate was 0.0323% of the weight of the second portion of substrate.

The substrate with the absorbed platinum solution and the substrate with the absorbed palladium solution were dried and heated, and the resulting two types of catalytic pellets are uniformly mixed.

EXAMPLE IV

A complexed platinum solution was prepared by dissolving platinum in aqua regia and then complexing with concentrated NH$_4$OH. Trace amounts of thorium and cerium were added to this solution as promoters.

A complexed palladium solution was prepared by dissolving palladium in aqua regia and then complexing with NH$_4$OH. A trace amount of nickel was added to this solution as a promoter.

4210gm of alumina pellets, enough for two 260 cu.in. converters, was divided into a first group of 2220gm. and a second group of 1990gm.

A first solution was prepared by using a sufficient amount of the platinum solution to give 2.22gm of platinum and adjusting the volume to the incipient wetness of the first group of pellets. The first group of pellets was dipped into the first solution, dried, and heated.

A second solution was prepared by using a sufficient amount of the palladium solution to give 0.888gm of palladium and adjusting the volume to the incipient wetness of the second group of pellets. The second group of pellets was dipped into the second solution, dried, and heated.

The first and second groups of pellets were then uniformly mixed to provide a catalyst containing platinum and palladium in a 5 to 2 ratio, and the catalyst was sufficient to fill two converters with each converter having a total platinum and palladium content of 0.05 troy ounces.

The total weight of platinum contained by the platinum-containing pellets was 0.1% of the weight of the platinum-containing pellets, and the total weight of palladium contained by the palladium-containing pellets was 0.045% of the weight of the palladium-containing pellets.

EXAMPLE V

A complexed platinum solution was prepared by dissolving platinum in aqua regia and then complexing with concentrated NH$_4$OH.

A complexed palladium solution was prepared by dissolving palladium in aqua regia and then complexing with NH$_4$OH.

It was desired to prepare a catalyst containing platinum and palladium in the ratio of 5 to 2, and each converter fill of catalyst was to contain a total of 0.05 troy ounces of platinum and palladium. Accordingly, each converter fill would contain 1.111gm of platinum and 0.444gm of palladium.

For a desired amount of catalyst, the number of converter fills was calculated, and a sufficient amount of the platinum solution was used to provide an amount of platinum equal to 1.111 times the number of converter fills. The volume of the solution was adjusted to the incipient wetness of the amount of alumina substrate pellets that would result in the amount of platinum in the solution being 0.1% by weight of this amount of pellets. These pellets were then dipped into the platinum solution so that all of the solution was absorbed, and the pellets were dried and heated.

An amount of palladium solution was used that would give a total amount of palladium of 0.444 times the number of converter fills, and the volume of this solution was adjusted to the incipient wetness of the remainder of the pellets. These pellets were then dipped into the palladium solution to absorb all of the solution, and the pellets were dried and heated.

The foregoing can be illustrated by an example. It is believed that the density of the alumina pellets used for a catalyst designated HN-2238 was such that two 260 cu.in converters required 4167gm of pellets. Two converters fills require 2.222gm of platinum and 0.888gm of palladium.

A platinum solution is prepared as previously described containing 2.222gm of platinum, and the volume of this solution is adjusted to the incipient wetness of 2222gm of pellets. 2222gm of pellets are dipped into the platinum solution to absorb all of the solution, dried, and heated.

A palladium solution is prepared as previously described so that the solution contains 0.88gm of palladium, and the volume of the solution is adjusted to the incipient wetness of 1945gm of pellets. 1945gm of pellets are then dipped into the palladium solution to absorb all of the solution, dried, and heated.

The platinum-containing pellets contained platinum in the amount of 0.1% of the weight of the platinum-containing pellets, and the palladium-containing pellets contained palladium in the amount of 0.045% of the weight of the palladium-containing pellets. The platinum-containing pellets and the palladium-containing pellets are then mixed, and the resulting catalyst can be used to fill two converters with a total of 0.05 troy ounces of platinum and palladium, with the platinum and palladium being in the ratio of 5 to 2.

EXAMPLE VI

This catalyst was prepared in the same way as the catalyst described in Example V, but a trace amount of chromium was added to the palladium solution before the pellets were dipped into this solution.

The complexing of the solutions described in the foregoing examples is advantageously carried out by using an excess of the amount of ammonia that is required to complex the solution. Use of two, three or more times the stoichiometric amount of ammonia necessary to form the complex has been found to be beneficial, and it is believed that even more ammonia could be advantageous in certain circumstances.

The catalyst, i.e., the substrate and the absorbed solution, is dried soon after the solution is absorbed. Generally, the drying step begins within ½ hour after the substrate is placed into the solution. The drying step is performed at relatively low temperatures. Drying has been performed continuously by using a hot air gun and a conveyor for the catalyst, and the drying is performed at less than 1000° F. In drying the catalysts described in Examples III through VI, the vents of the hot air gun were opened to provide a good air flow so that the temperature of the air was not at a maximum. The heated air was believed to be at a temperature of about 550° F. This heated air heated the catalyst gradually and avoided popping of the catalyst.

After the drying step, the catalyst may be heated, again at relatively low temperatures, e.g., by using a flow of hot air at a temperature of about 750° F. to about 1000° F. The heating can also be performed continuously by using a conveyor, and the conveyor can carry the catalyst first through a drying zone and then through a heating zone. In heating the catalysts described in Examples III through VI, a hot air gun was used, and the vents on the gun were closed to provide a hotter air flow then that used for the drying step. The heating step is carried out for a relatively short period of time, and it is believed that the heating step can be discontinued as soon as the ammonia is driven off. It is believed that heating the catalysts described in Examples III through VI for more than about 25 minutes is unnecessary.

The drying and/or heating step activates the catalyst, i.e., makes the catalyst catalytically reactive with the hydrocarbons and carbon monoxide of an exhaust stream of an internal combustion engine to oxidize the hydrocarbons and carbon monoxide to carbon dioxide and water. The catalyst is activated at a temperature which is lower than the "calcining" temperatures which are conventionally used in activating catalysts, which are usually over 1,000° F. My catalyst could be heated above 1000° F. if desired, but such high heating is not necessary to activate the catalyst.

I have found that catalysts prepared in accordance with my invention and which are prepared from complexed solutions, become activated at about 550° F. It is believed that the reason for the relatively low activation heat is that activation of the catalyst is obtained by driving off the chlorides and that complexing the solutions forms ammonium chloride, which is relatively easily driven off. Catalysts which are prepared from non-complexed solutions should be heated above 550° F., preferably above 750° F., in order to activate them.

The temperature of an exhaust stream of an automobile may be as high as 1800° F. at the exhaust manifold and as high as 1300° F. in the tailpipe below the automobile. Catalysts in a catalytic converter located at the manifold or below the automobile will be heated to these temperatures by the exhaust stream. Accordingly, if substrates prepared in accordance with the invention, whether prepared from complexed or non-complexed solutions, are to be placed in the exhaust stream of an automobile, it is not necessary to heat the substrates sufficiently to activate the substrates since the substrates will be heated and activated by the exhaust stream. After the two groups of substrates are dipped in the platinum-containing solution and the palladium-containing solution, the impregnated substrates need be heated only sufficiently to dry the substrates. If the platinum and palladium solutions have been complexed with ammonium hydroxide, it is desirable that the heating be carried out at a temperature sufficient to drive off the ammonia in order to prevent the emission of ammonia from the automobile tailpipe when the substrates are heated by the exhaust stream. The drying of the impregnated substrates can be carried out either before or after the two groups of substrates have been mixed.

When the dried substrates are placed in the exhaust system of an automobile and the automobile engine is started, an exhaust stream which is relatively rich in CO and HC first passes over the substrates, and the substrates are subjected to a reducing atmosphere. As the ingine warms up and the automatic choke shuts off, the relative amounts of hydrocarbons and carbon monoxide decrease with respect to the nitrogen oxides, and the substrates are subjected to an oxidizing atmosphere. As the temperature of the substrates is increased by the hot exhaust stream, the substrates if not previously activated during processing, will now become activated and begin to catalytically react with the hydrocarbons and carbon monoxide notwithstanding the fact that the substrates were not activated before being placed in the exhaust system.

As used in the claims the non-activated platinum and palladium impregnated substrates can be referred to as a "catalyst precursor", and the term "catalyst" will refer to the activated substrates.

The platinum is advantageously used at the rate of about 0.1% by weight of the substrate material on which the platinum is deposited. It is believed that using increased amounts of platinum will not significantly improve the performance of the catalyst.

Catalyst containing platinum and palladium on separate substrate was prepared as described in the foregoing examples but without complexing the platinum or palladium solutions. This catalyst exhibited good activity, although it was slightly less active than the catalysts which were prepared using the complexed solutions.

While in the foregoing specification a detailed description of a specific embodiment of the invention was set forth for the purpose of illustration, it is to be understood that many of the details herein given may be varied considerably by those skilled in the art without departing from the spirit and scope of the invention.

I claim:

1. A method of preparing a catalyst precursor for use in suppressing hydrocarbon and carbon monoxide emission from internal combustion engines comprising the steps of:
   a. contacting a first substrate with a solution of a platinum compound so that the first substrate absorbs platinum,
   b. drying the first platinum-containing substrate,
   c. contacting a second substrate with a solution of a palladium compound so that the second substrate absorbs palladium,
   d. drying the second palladium-containing substrate, and
   e. mixing the first platinum-containing substrate and the second palladium-containing substrate whereby a platinum and palladium containing catalyst precursor is formed which can be activated to provide a catalytically reactive catalyst by heating the catalyst precursor.

2. A method of preparing a pelleted catalyst precursor for use in suppressing hydrocarbon and carbon monoxide emission from internal combustion engines comprising the steps of:
   a. contacting a first group of pellets with a solution of a platinum compound so that the first group of pellets absorbs platinum,
   b. drying the first group of platinum-containing pellets, c. contacting a second group of pellets with a solution of a palladium compound so that the second group of pellets absorbs palladium, d. drying the second group of palladium-containing pellets, and e. mixing the first group of platinum-containing pellets and the second group of palladium-containing pellets whereby a platinum and palladium containing catalyst precursor is formed which can be activated to provide a catalytically reactive catalyst by heating the catalyst precursor.

3. A method of preparing a catalyst for use in suppressing hydrocarbon and carbon monoxide emission from internal combustion engines comprising the steps of:

a. contacting a first substrate with a solution of a platinum compound so that the first substrate absorbs platinum, b. drying the first platinum-containing substrate, c. contacting a second substrate with a solution of a palladium compound so that the second substrate absorbs palladium, d. drying the second palladium-containing substrate, e. mixing the first platinum-containing substrate and the second palladium-containing substrate, and f. heating the first and second substrates to a temperature above 750° F. to activate the substrates and form a catalyst which will catalytically react with hydrocarbons and carbon monoxide to form carbon dioxide and water.

4. A method of preparing a pelleted catalyst for use in suppressing hydrocarbon and carbon monoxide emission from internal combustion engines comprising the steps of:

a. contacting a first group of pellets with a solution of a platinum compound so that the first group of pellets absorbs platinum, b. drying the first group of platinum-containing pellets, c. contacting a second group of pellets with a solution of a palladium compound so that the second group of pellets absorbs palladium, d. drying the second group of palladium-containing pellets, e. mixing the first group of platinum-containing pellets and the second group of palladium-containing pellets, and f. heating the first group of platinum-containing pellets and the second group of palladium-containing pellets to a temperature above 750° F. to activate the pellets and form a catalyst which will catalytically react with hydrocarbons and carbon monoxide to form carbon dioxide and water.

* * * * *